United States Patent [19]

Bennett

[11] E Re. 29,356

[45] Reissued Aug. 16, 1977

[54] SYSTEM FOR CHIPPING AND MOVING ICE

[75] Inventor: John D. Bennett, Denton, Tex.

[73] Assignee: Sun Oil Company (Delaware), Dallas, Tex.

[21] Appl. No.: 724,877

[22] Filed: Sept. 20, 1976

Related U.S. Patent Documents

Reissue of:

[64] Patent No.: 3,888,544
Issued: June 10, 1975
Appl. No.: 420,815
Filed: Dec. 3, 1973

[51] Int. Cl.[2] ..... E01H 5/12

[52] U.S. Cl. ..... 299/25; 37/26; 37/43 K; 172/59; 299/41; 299/86; 299/87

[58] Field of Search ..... 299/25, 41, 51, 76, 299/89, 86; 37/26, 43 K; 172/59

[56] References Cited

U.S. PATENT DOCUMENTS

| | | | |
|---|---|---|---|
| 536,912 | 4/1895 | Boland et al. | 299/77 |
| 1,593,523 | 7/1926 | Wright | 37/43 K |
| 3,006,624 | 10/1961 | Doxey | 299/77 X |
| 3,148,917 | 9/1964 | Thompson | 299/25 |
| 3,418,023 | 12/1968 | Webster | 299/51 X |
| 3,472,555 | 10/1969 | Theermann et al. | 299/41 |

*Primary Examiner*—Ernest R. Purser
*Attorney, Agent, or Firm*—J. Edward Hess; Donald R. Johnson; J. H. Phillips

[57] ABSTRACT

An ice chipper comprising a pair of cylindrical drums each mounted for counter-rotation about parallel, generally vertical axes. Each drum includes an outwardly rounded, disk shaped bottom surface and an auger flight spiraled helically about the outer cylindrical surface thereof. The auger flights each include a plurality of spaced, outwardly extending teeth to chip the ice abutting the front of the system. The chipper is mounted to the front of a tractor and each drum includes a hydraulic motor which is operated by a hydraulic pump also carried by the tractor. Rotation of the drums causes the auger teeth to chip the ice and tends to pull the drums forwardly while the auger flights carry the ice particles up and out away from the cleared area. Tilting the system forwardly and rearwardly upon the rounded drum bottom surfaces varies the depth of cutting in the vertical direction.

11 Claims, 6 Drawing Figures

SYSTEM FOR CHIPPING AND MOVING ICE

Matter enclosed in heavy brackets [ ] appears in the original patent but forms no part of this reissue specification; matter printed in italics indicates the additions made by reissue.

BACKGROUND OF THE INVENTION

The invention relates to ice removal and, more particularly, to an ice chipping and removal system including a pair of vertical, rotatable drums.

In the petroleum exploration and production industry it is often necessary to move men and equipment through relatively hostile environmental regions. In recent years the emphasis on oil production from the far north has necessitated development of new techniques for moving materials through the Arctic regions.

In the Arctic, large regions are often covered by thick layers of ice and snow. As these layers move about, their edges override one another and form pressure ridges and hummocks in the ice. Hummocks are ice regions which are harder than the surrounding ice, have a very smooth outer surface and are formed when a pressure ridge heals itself through years of weathering. The arctic terrain is also shrouded by snow drifts which collect against the pressure ridges. In order to conduct petroleum production activities in the Arctic it is desirable to level off the pressure ridges and other [protuberbances] *protuberances* which contribute to an extremely rough ice surface, for example, a smooth road surface must be formed through the rough ice in order to move vehicles and equipment across it.

One prior art system which has been used to smooth a path through the rough ice includes a large, toothed drum rotatable about a horizontal axis. The drum is supported on skids pushed by a large tractor and is rotated independantly from the bottom upwardly to undercut the ice. The major problem with such horizontal drum cutters is that when snow is encountered it is difficult to know what is beneath the snow, such as where the top surface of the ice is located. Since a rotating horizontal drum cuts ice equally well in both the vertical and horizontal directions, if the skids fall into a snow filled hole before the rotation of the drum can be stopped it may cut all the way down through the ice and take the tractor and operator with it through the hole into the underlying water. Needless to say, such systems have proven dangerous to both men and equipment.

Prior art snow removal systems, such as that disclosed in U.S. Pat. No. 1,615,461 to E. H. Lichtenberg, have sought to provide a pair of vertical rotating cutters for flaking the snow and moving it toward the intake of a blower which throws the snow away from the roadbed being cleared. While the Lichtenberg machine includes vertical rotating cutters, it would not be adaptable for cutting ice because of the lack of cutting teeth and augers for removing the ice chips. Further, the Lichtenberg cutters rotate toward one another to move snow into the blower while the present drums include overlapping teeth and rotate in the opposite direction, away from one another, to produce a forwardly directed force tending to move the machine through the ice.

Similarly, ice cutting equipment such as that shown in FIG. 1 of U.S. Pat. No. 3,696,624, entitled Bucket Wheel Ice Cutter, to John D. Bennett, the present inventor, employs counter-rotating bucket wheels mounted on the front of a ship. Such marine systems are designed primarily to cut through the entire thickness of a floating ice sheet and the cutting wheels do not include such features of the present drum cutters such as augers to remove ice chips from the path and a bottom drum surface which prevents cutting in the vertical direction except when desired. Further, in the prior art cutter the paths of the counter-rotating bucket wheels do not overlap in the region between the wheels to produce a forwardly directed force as in the system of the present invention.

It is therefore an object of the present invention to provide an improved system for cutting and removing ice and, more particularly, for forming an elongate, relatively smooth path through a rough snow and ice covered terrain. The system of the present invention provides a more efficient and relatively safe means for clearing a road through ice and snow.

SUMMARY OF THE INVENTION

The invention relates to a system for chipping ice and forming a path therethrough including a pair of vertically oriented drums each having teeth and an outwardly rounded bottom surface. Rotation of the drums while applying a forward force thereto chips the ice, augers the chips out of the path and produce a forwardly directed force tending to pull the drums through the ice.

In another aspect, the present invention includes a system for chipping and forming a pathway through ice which includes a pair of cylindrical drums mounted for rotation about parallel axes. A plurality of spikes protrude outwardly from each of the drums and the spikes on different drums intermesh with one another in the region between the drums when they are rotated. The drums are rotated in opposite directions away from one another at the front to chip ice and tend to pull the drums forwardly through the ice.

In still another more particular aspect the invention comprises a system for chipping and moving ice to form a pathway through rough icy terrain including a tractor for applying a forward force. An angular frame having a top and a back member is attached to the front of the tractor. A pair of cylindrical drums having smooth downwardly rounded bottom surfaces are mounted beneath the top member for rotation about parallel, generally vertical axes lying in front of the back member. An auger, including a plurality of flights, is spiraled about the outside periphery of each of the drums in opposite directions. A plurality of spikes protruded outwardly from each auger flight on each drum. Each spike on each flight lies in the same horizontal plane as another spike on a different flight of the same drum. All spikes on one drum lie in different horizontal planes from all spikes on the other drum to permit intermeshing of the spikes without interference. The drums are rotated in opposite directions, toward one another at the rear, to chip ice, auger the chips up and away from the system and tend to pull the drums forwardly through the ice to form a pathway.

BRIEF DESCRIPTION OF THE DRAWING

For a more complete understanding of the present invention and for further objects and advantages thereof, reference may now be had to the following description taken in conjunction with the accompanying drawing, in which.

DETAILED DESCRIPTION

Figure 1:
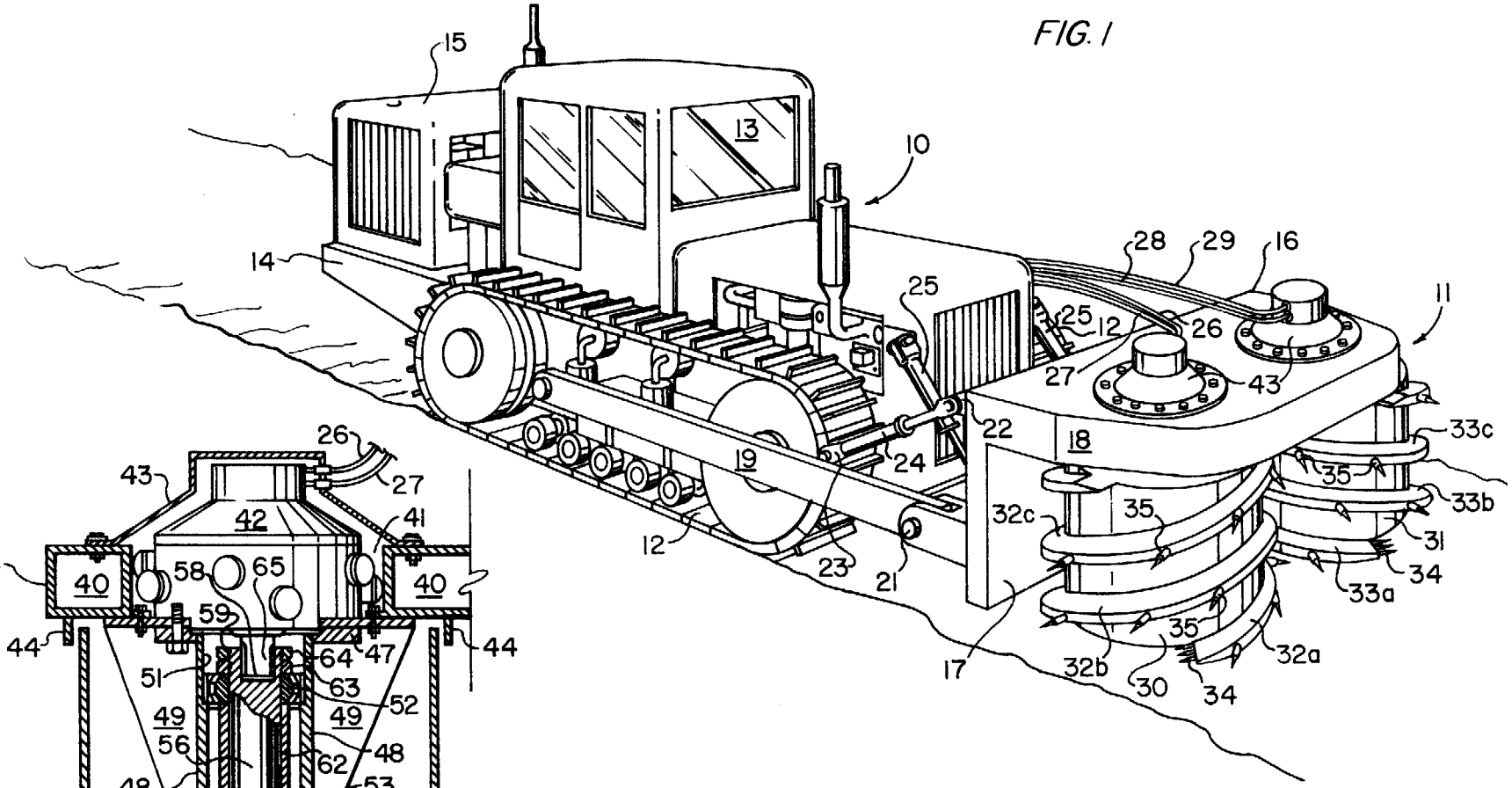
FIG. 1 is a perspective view of the ice cutting system of the present invention mounted on the front of a tractor.

Referring to FIG. 1, there is shown a tractor 10 having the ice chipping and moving system of the present invention 11 mounted on the front. The tractor 10 may be of a conventional type having endless tracks 12, an enclosed Cab 12 for operation in arctic regions and a rear platform 14 which mounts an auxiliary motor driving a pair of hydraulic pumps 15, the function of which will be further explained below.

The ice chipper 11 includes a hollow angular frame 16 having a generally vertical back member 17 and a generally horizontal top member 18. The tractor 10 includes as pair of generally horizontal tooth bars 19 which are attached to lower portions of the back member 17 by means of pivotal connections 21. Top portions of the back member 17 are also attached to the tool bars 19 at pivotal connections 22 and 23 through tilting hydraulic cylinders 24. The tool bars 19 are attached to the front of the tractor 10 by lifting hydraulic cylinders 25. Operation of the hydraulic cylinders 24 tilts the frame 16 backward and forward about the connections 21 while operation of the hydraulic cylinders 25 raises and lowers the entire frame 16. The cylinders 24 and 25 are actuated through conventional control means on the tractor 10.

One of the motor driven hydraulic pumps 15 is connected to the ice chipper 11 by means of a first pair of lines 26 and 27 while the other pump is connected via a second pair of lines 28 and 29.

Figure 2:
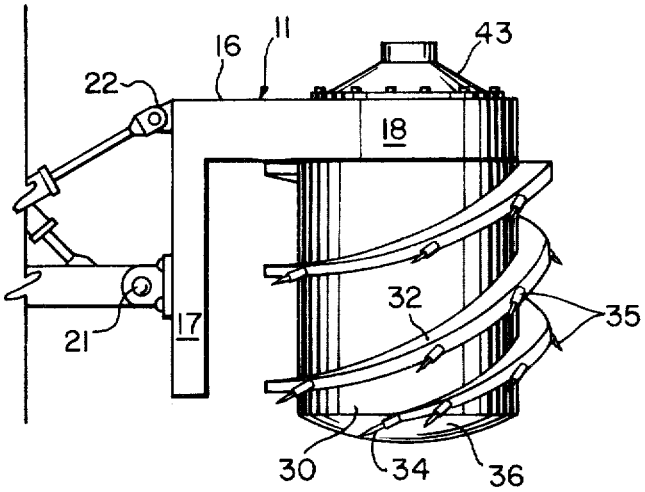
FIG. 2 is a side elevational view of the ice cutting system of the present invention.

The ice chipper 11 includes a pair of cylindrical drums 30 and 31 mounted for rotation about parallel, generally vertical axes. Each of the drums 30 and 31 comprises an auger having a plurality of flights, 32 a–c and 33 a–c, respectively, spiraled about the outside surface. The auger on one of the drums has a right-hand thread while the auger on the other drum has a left-hand thread so that both will lift ice chips and snow when the drums are rotated in opposite directions toward one another. Each one of the auger flights 32 a–c and 33 a–c includes a plurality of downwardly extending spikes 34 located at the lower end thereof and a plurality of outwardly extending spikes 35 spaced along the length of the flights. On each one of the drums, the spikes 35 on each auger flight track one another, i.e., each spike on each flight is located in the same horizontal plane as another spike on each of the other two flights. The spikes 35 on different drums are located on different horizontal planes so that the spikes will intermesh one another without interference when the two drums are rotated. Each of the spikes 34 and 35 comprise a tooth holder and an elongate, pointed cutting tooth which can be replaced if damaged. As best shown in FIG. 2, the drums 30 and 31 each include a smooth, outwardly rounded lower end surface 36 for supporting the weight of the drums and for sliding smoothly across the surface of snow and ice during operation. The spikes 34 located at the lower ends of each of the auger flights 32 and 33 extend downwardly into the same plane as the lowest portion of the rounded end surfaces 36.

Figure 6:
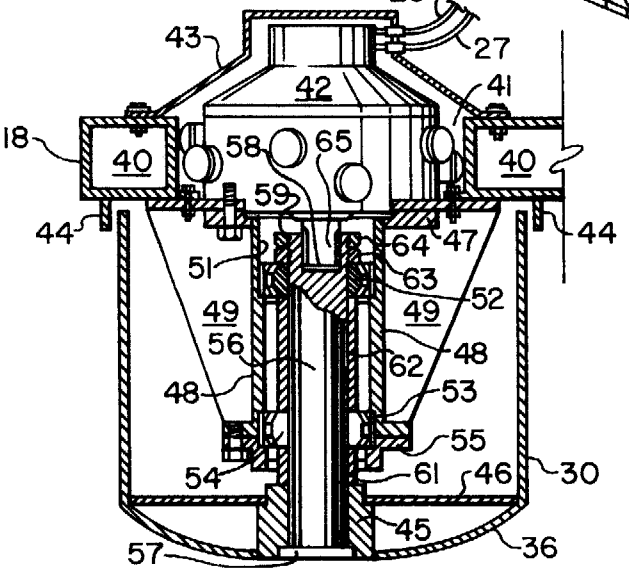
FIG. 6 is a cross-section view of one of the drums, having the auger flights removed, and taken about lines 6—6 of FIG. 3.

Referring next to FIG. 6, there is shown a partial cross-section and partial cut-away view of one of the drums 30. The top member 18, of the angular frame 16 (FIG. 1), is preferably hollow to reduce the weight of the structural assembly and to provide an internal void 40 for storing a reserve supply of hydraulic fluid. A circular opening 41 is formed in the top member 18 to receive a hydraulic motor 42 which rotates the cylinder 30. The motor 42 may be of a type similar to the Model B400S hydraulic motor manufactured by the Staffa Motor Company of Great Britain. The hydraulic motor 42 is coupled to one of the hydraulic pumps 15 by means of the hydraulic fluid lines 26 and 27 which extend through openings in a bolt-on snow cover 43.

The drum assembly shown in FIG. 6 comprises the cylindrical drum 30 which is fitted up into an overlapping annular ring member 44 and closed at the bottom by the rounded end surface 36. Located near the bottom of the drum 30 is a central hub 45 having an axial opening therethrough and which is attached at the top to a circular reinforcing plate 46 and at the bottom to the rounded end surface 36. A support frame 47 includes a central tube 48 and a plurality of vertically and outwardly extending support webs 49. An annular recess 51 in the upper, inner portion of the tube 48 receives a top bearing assembly 52 while another annular recess 53 in the lower, inner portion of the tube 48 receives a bottom bearing assembly 54. The bottom bearing assembly 54 is held in place within the annular recess 53 by a bolt-on retaining member 55. A driving pin 56 includes a flared head 57 at one end and, at the other end, an internally splined socket 58 and outer threads 59.

The support frame 48 is bolted to the undersurface of the top member 18 and the bottom bearing assembly is placed within the annular recess 53 and secured by the retaining member 55. The driving pin 56 is inserted up through the central hub 45, a lower sleeve member 61, the bottom bearing assembly 54, a central sleeve member 62, the top bearing assembly 52 and a pair of retaining nuts 63 and 64. When the retaining nuts 63 and 64 are tightened on the external threads of the driving pin 56, all of the parts surrounding the pin 56 are pulled into a rigid mechanism which will rotate as a single assembly on the bearings 52 and 54 and turn the drum 30.

After the drum is assembled the hydraulic motor 42, which includes a splined drive shaft 65, is placed down into the opening 41 so that the drive shaft 65 is received into the splined socket 58 to rotate the driving pin 56. The motor 42 is then bolted into position, the snow-cover 43 added and the two hydraulic fluid hoses 26 and 27 are connected to the external couplings of the motor 42 to complete the assembly.

Figure 3:
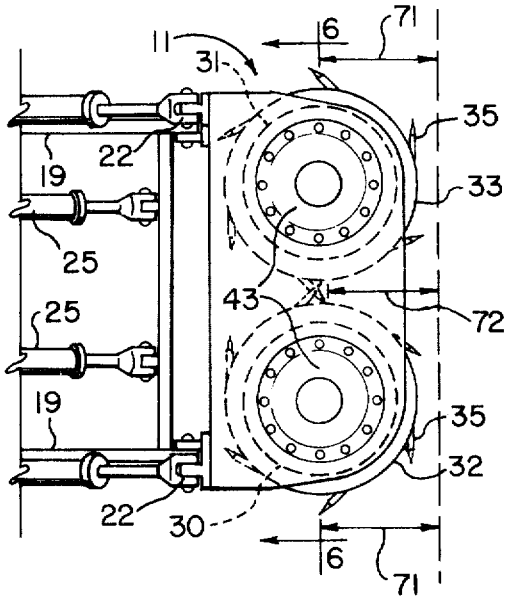
FIG. 3 is a top plan view of the ice cutting system of the present invention.

Referring now to FIG. 3, there is shown a top view of the ice removal system 11 of the present invention. The drums 30 and 31 are positioned relative to one another so that the outermost paths of the auger flights 32 a–c and 33 a–c are preferably separated from one another by a distance slightly greater than the length of one of the spikes 35. The outermost circumferential paths of the tips of the spikes 35 overlap and intermesh one another by a maximum distance which is preferably about equal to the length of one spike 35. As set forth above spikes 35 are positioned on the augers 32 and 33 so that no two spikes 35 on different drums are located at the same height and, hence, there is no possibility of interference between spikes 35 on different drums if one of the drums is stopped while the other is still rotating. As can be seen from FIG. 3, the outermost circumferential paths of the tips of the spikes 35 on each drum 30 and 31 overlap one another in the region between the drums.

The engagement of the teeth 35 with ice in the regions extending from the front center of each drum around the outer periphery to a point located on a common diameter line of the two drums produces a force which tends to pull the drums in a forward direction through the ice. This forward force acts over a linear distance represented by the arrows 71. The engagement of the teeth 35 with ice in the regions extending from the front center of each drum around the inner periphery to the point of intersection of the outermost circumferential paths of the tips of the teeth, produces a force which tends to push the drums in a rearward direction. This rearward force acts over a linear distance represented by the arrow 72. Since the teeth act through a greater distance tending to pull the drums forward than the distance tending to push the drums rearward, there is produced a net forward thrust whereby the drums tend to pull themselves forward through the ice and reduce the pushing force required by the tractor 10.

The system of the present invention is designed to cut through ice primarily in the horizontal direction along a generally level grade line. As can be seen from FIG. 2, the spikes 34 located at the lower end of each auger flight extend down to approximately the same horizontal plane as the bottom of the rounded end surface 36. Accordingly, if the drums 30 and 31 are. held with their axes of rotation vertical, they will cut in the horizontal direction on a level grade. If the drums 30 and 31 are tilted forwardly, they will cut horizontally on a gradually downwardly inclined grade. If the drums 30 and 31 are tilted rearwardly, they will cut horizontally on a gradually upwardly inclined grade. The drums may be readily tilted forwardly or rearwardly using the hydraulic cylinders 24. In no case however, will the drums cut ice in the vertical direction without motion in the horizontal direction and thus eliminate the possibility of accidentally losing control over the rotating drums and cutting through the ice to underlying water.

Figure 4:
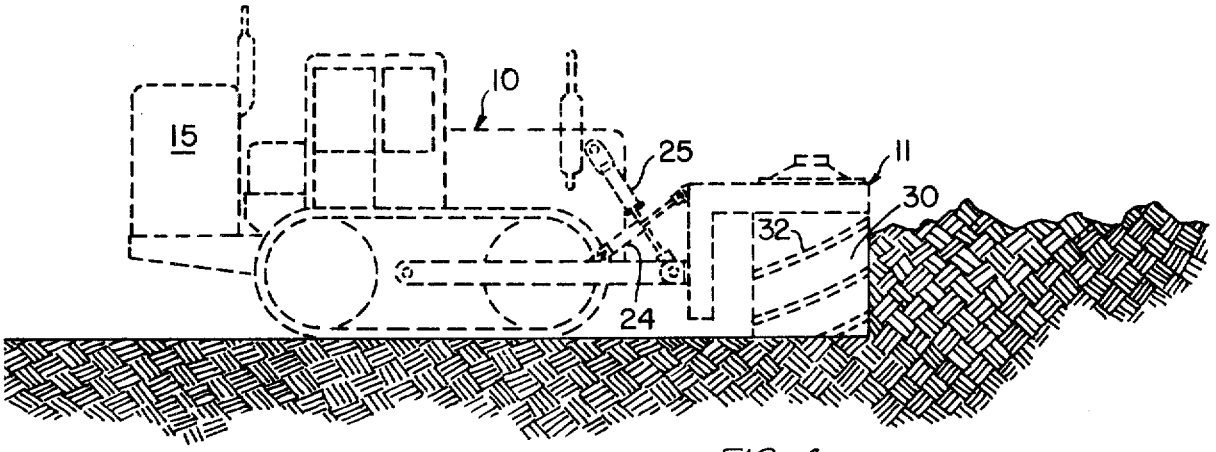
FIG. 4 is a schematic side view of the ice cutting system of the present invention forming a roadway through rough ice.
Figure 5:
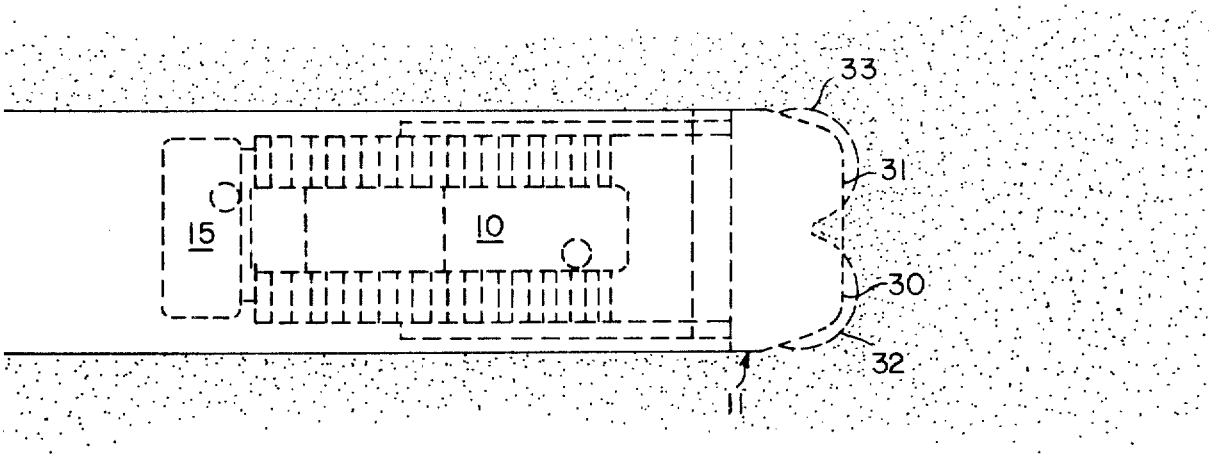
FIG. 5 is a schematic top view of the ice cutting system of the present invention forming a roadway through rough ice.

In actual operation, as illustrated in FIGS. 4 and 5, the auxiliary engine and hydraulic pumps 15 are actuated to provide hydraulic fluid flow and rotate both the drums 30 and 31 at a chosen rate e.g., 100 RPM. As the drums are rotating, the tractor 10 is operated to apply a forward force and the drum spikes 34 and 35 chip the ice into particles. As the ice is chipped into particles it is carried upwardly by the auger flights and dumped to the outside along with any snow which may be in the path. As can be seen from FIG. 4, the system of the invention forms a path through rough ice the width of the drums and on a relatively level grade. In the event it is desirable to cut vertically deeper or shallower into the ice, the drums are simply tilted forwardly or rearwardly to vary the slope of the grade.

Having discussed the invention in connection with certain specific embodiments thereof, it is to be understood that further modifications may now suggest themselves to those skilled in the art and it is intended to cover such modifications as fall within the scope of the appended claims.

What is claimed is:

1. A system for chipping ice and forming a pathway through rough, icy terrain, comprising: a pair of cylindrical drums mounted for rotation about parallel vertical axes, each of said drums including a smooth, outwardly rounded lower end surface to support the weight of the drum; a plurality of spikes protruding outwardly from the cylindrical outside surface of each drum to engage and chip the ice, the circular paths formed by the tops of the spikes when the drums are rotated being overlapping in the [regioon] *region* between the drums; and means for rotating said drums in opposite directions to chip ice and pull the drums forwardly through the ice to form a pathway along a generally level grade.

2. A system for chipping ice and forming a pathway through rough, icy terrain, as set forth in claim 1, which also includes:

means for applying a forward force to said drums to increase the rate of ice cutting.

3. A system for chipping ice and forming a pathway through rough, icy terrain, as set forth in claim 2, further including: an auger spiraled around the cylindrical outside of each drum, each of said augers including at the lower ends thereof a plurality of spikes extending downwardly to a plane level with the rounded bottom surfaces of each drum; and also including means for tilting said drums forwardly and rearwardly to vary the grade slope of said pathway.

4. A system for chipping ice and forming a pathway through rough icy terrain, as set forth in claim 1, wherein:

said rotating means includes a hydraulic motor connected to each drum and a hydraulic pump connected to drive said motor.

5. A system for chipping and forming a pathway through ice, comprising:

a pair of cylindrical drums mounted for rotation about parallel axes;

a plurality of spikes protruding outwardly from each of said drums, the spikes on different drums intermeshing with one another in the region therebetween when said drums are rotated; and means for rotating said drums in opposite directions [toward] *away from* one another at the front to chip ice and tend to pull the drums forwardly through the ice.

6. A system for chipping and forming a pathway through ice, as set forth in claim 5, which also includes:

an auger spiraled about the outside surface of each drum to lift and remove the chipped ice when the drums are rotated.

7. A system for chipping and forming a pathway through ice, as set forth in claim 6 wherein each auger on each drum comprises a plurality of auger flights; and wherein said spikes are mounted to said auger flights.

8. A system for chipping and forming a pathway through ice, as set forth in claim 7 which also includes:

means for applying a forward force to said drums to increase the rate of ice chipping.

9. A system for chipping and moving ice to form a pathway through rough, icy terrain, comprising:

a tractor for applying a forward force;

an angular frame having a back member and a top member, said back member being attached to the front of said tractor;

a pair of cylindrical drums mounted for rotation beneath said top member about parallel, generally vertical axes lying in front of said back member, each of said drums having smooth downwardly rounded bottom surfaces;

a auger, comprising a plurality of flights, spiraled around the outer periphery of each of said drums, in the opposite direction;

a plurality of spikes protruding outwardly from each auger flight on each of said drums, each spike on each flight lying in the same horizontal plane as another spike on a different flight of the same drum and all spikes on one drum lying in different horizontal planes from all spikes on the other drum to permit intermeshing of the sikes without interference therebetween; and means for rotating said drums in opposite directions, [toward] *away from* one another at the front, to chip ice, auger the chips up and away from the system and tend to pull the drums forwardly through the ice to form a pathway.

10. A system for chipping and moving ice to form a pathway through rough, icy terrain, as set forth in claim 9, wherein said means for rotating said drums includes;

a pair of hydraulic motors mounted within openings in said top member and having output shafts connected, respectively, to rotate said drums; and a pair of auxiliary motor driven hydraulic pumps carried by said tractor and fluid coupled to drive said motors.

11. A system for chipping and moving ice to form a pathway through rough, icy terrain, as set forth in claim 9, which also includes:

a spike positiond at the lower end of each auger flight and extending downwardly to the level of the rounded drum bottom surfaces; and means for tilting the back member of said angular frame forwardly and rearwardly to vary the grade slope of said pathway.

* * * * *